Sept. 5, 1950  V. E. EDMONDS  2,521,051
COTTON PICKING MACHINE
Filed April 26, 1946  3 Sheets-Sheet 1

*INVENTOR.*
VERNE E. EDMONDS
BY
ATTORNEY

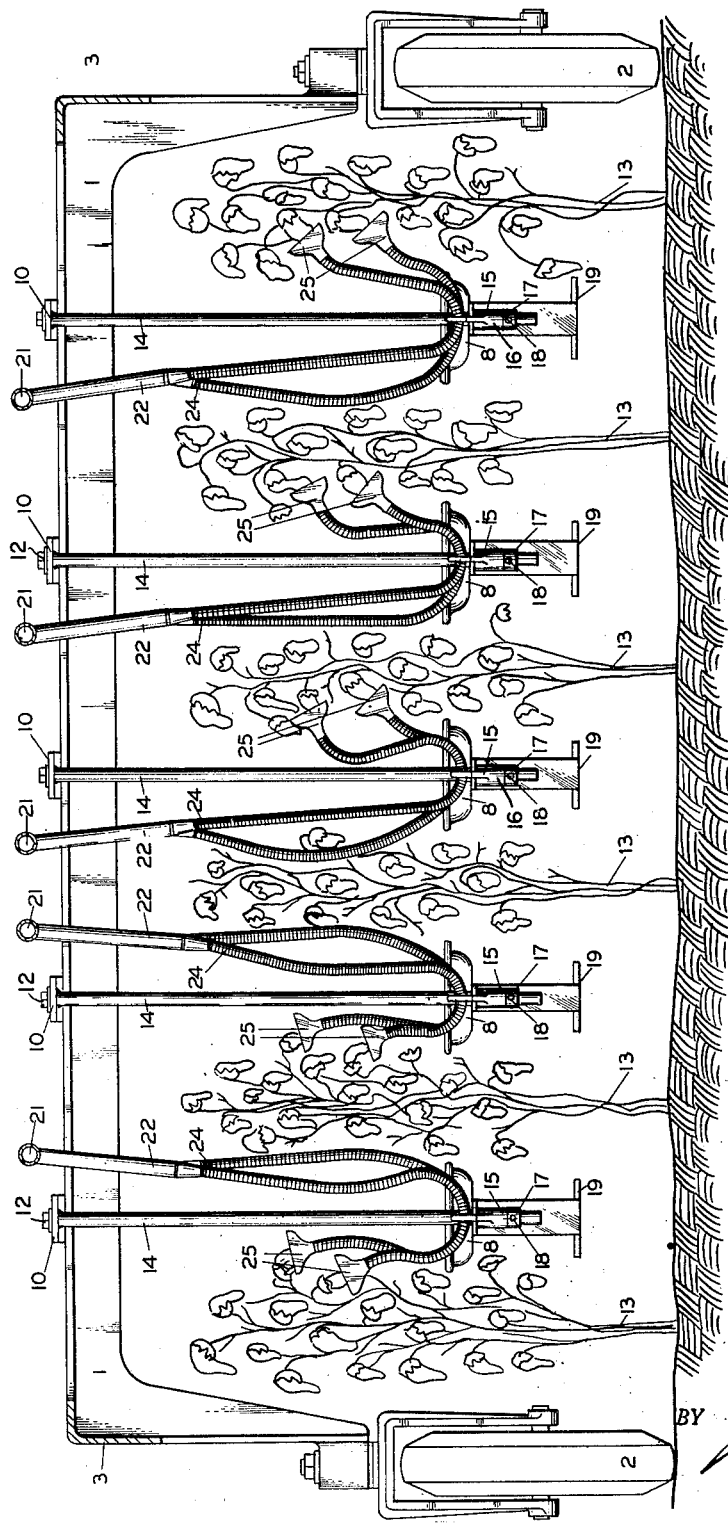

Sept. 5, 1950  V. E. EDMONDS  2,521,051
COTTON PICKING MACHINE
Filed April 26, 1946  3 Sheets-Sheet 3
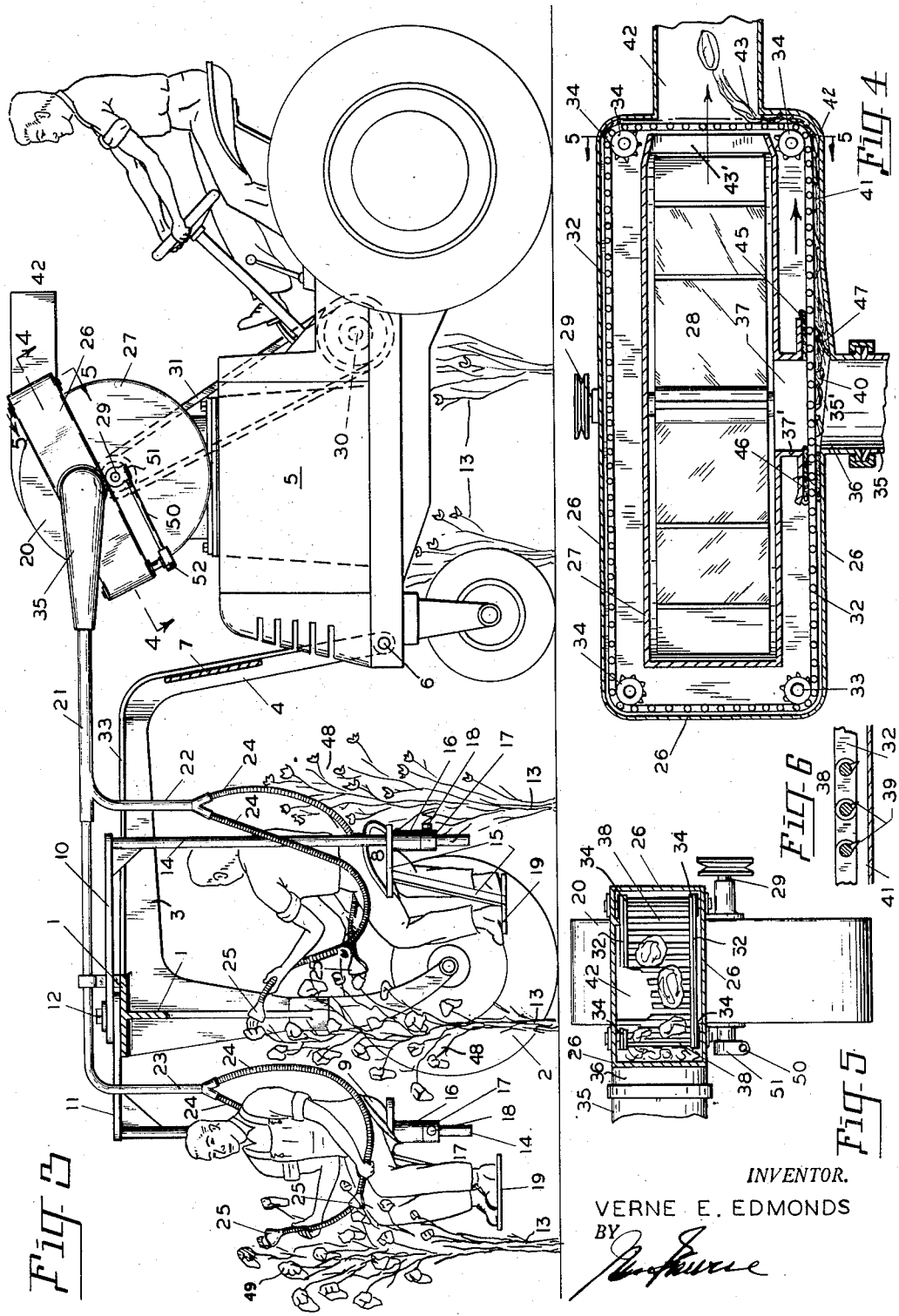
INVENTOR.
VERNE E. EDMONDS
BY Patented Sept. 5, 1950

2,521,051

UNITED STATES PATENT OFFICE 2,521,051

COTTON-PICKING MACHINE

Verne E. Edmonds, Portland, Oreg.

Application April 26, 1946, Serial No. 665,233

3 Claims. (Cl. 56—31)

The invention relates to machines for the picking of cotton and the like.

The primary object of the machine is to provide an arch connected to a tractor and having a multiple of seats suspended thereunder upon which are seated the cotton pickers.

Another object of the invention is to provide a vacuum fan mounted to and driven by the tractor, having a series of vacuum tubes leading therefrom and terminating in vacuum nozzles adjacent the pickers. The above said seats are so arranged so that one picker is seated in front of the other between each of the rows of cotton, each picker selecting a row of cotton plants and by using two vacuum nozzles he can quickly go over one side of the cotton plants next to him removing the cotton therefrom by said vacuum nozzles. One machine can straddle any number of rows of cotton plants depending upon the width of the machine.

A further object of my invention is the provision of means within the suction fan assembly for preventing the cotton from directly entering the blades of the fan. The object of which is to prevent the breaking of the cotton seeds within the cotton.

These and other incidental objects will be apparent in the drawings, specifications and claims.

Referring to the drawings:

Figure 2 is an end sectional view taken on line 2—2 of Figure 1, looking in the direction indicated.

Figure 3 is a side sectional view, taken on line 3—3 of Figure 1, looking in the direction indicated but with the rack omitted. In this view I have shown pickers picking the cotton.

Figure 4 is a sectional view on the line 4—4 of Figure 3 through the suction fan illustrating a mechanism for preventing the cotton from entering the blades of the fan.

Figure 5 is a sectional view taken on line 5—5 of Figure 3, looking in the direction indicated.

Figure 6 is a fragmentary sectional detail illustrating the construction of the links of chain for moving the cotton within the suction fan.

In the drawings:

Figure 1:
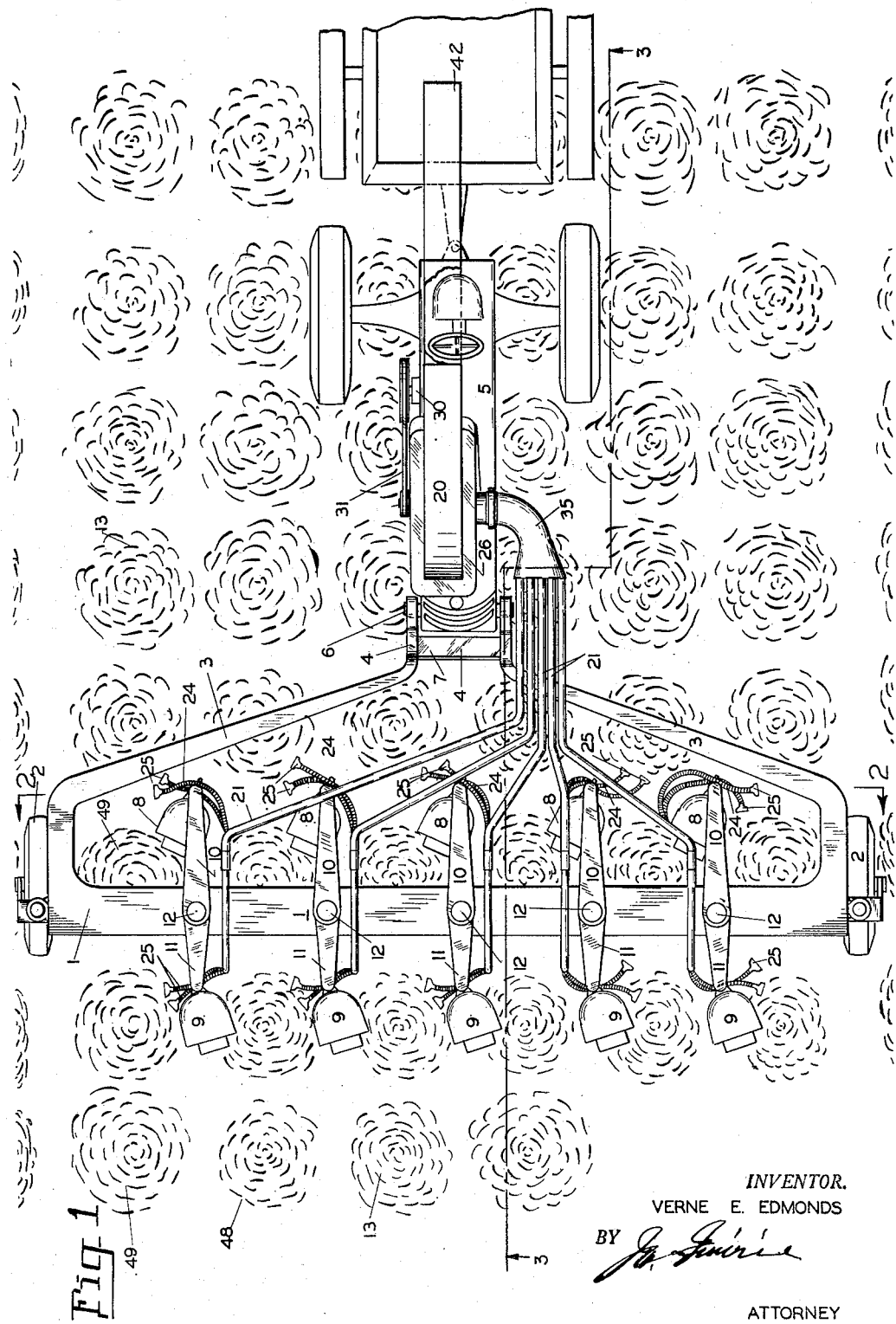
Figure 1 is a plan view of my new and improved cotton picking machine, consisting of a framework or arch connected to a tractor, and mounted on wheels. This arch supporting seats upon which the cotton pickers are seated while picking the cotton from the plants.

My new and improved cotton picker consists of a frame including an arch 1 mounted upon caster wheels 2 at its forward end and having side braces 3 extending rearwardly and down at 4, having their lower ends pivotally mounted to the tractor 5 at 6. These side arms are tightened together by the cross frame 7 making them into a rigid construction. As the tractor moves forward the arch is guided or controlled by the arms 3 mounted to the tractor, the caster wheels 2 following the movement of the same to either one side or the other.

Suspended and supported from the arch 1 are seats 8 and 9, the seat 9 being forward of the seat 8, the object of which will be later described. Supporting arms 10 and 11 are pivotally mounted to the arch 1 at 12, and are adjustable about the pivot point 12 so as to position the seats 8 and 9 to the desired position relative to the rows of cotton plants 13. Extending downward from the arms 10 and 11 are pedestals 14. The seats 8 and 9 are mounted upon bracket arms 15 which are adjustable up and down on the pedestals 14 at 16, the same being held in any suitable location by the collars 17, which are secured to the pedestals by the set screws 18.

A foot rest 19 is provided for the picker's feet so that he can stabilize his position. It can be seen that three adjustments can be made of the seat position, first by the location of the bars 10 and 11 relative to the angle to the arch 1, second the vertical position of the seats relative to the machine accomplished by the movement of the collars 17 up and down on the pedestals 14, and lastly the seats pivot around the pedestals 14 so that the picker can adjust himself to the most convenient position relative to the cotton plants during the time he is picking the cotton.

I employ a vacuum system for removing the cotton from the plant and it consists of a suction fan assembly 20 having a vacuum manifold 35 leading therefrom to the pickers' stations, consisting of the seats as above described. Extending downward from the manifolds 21 are tubes 22 and 23 manifolds 21 extending from the manifold 35 leading forwardly of the machine and connecting with rigid depending tubes 22 and 23 from which depend flexible hoses 24 establishing communication between the manifold 35 and nozzles 25, so that the nozzles 25, of which there is one for each hand of the picker, are in open communication with the suction fan 20.

To these tubes are connected flexible hoses 24 and suitable nozzles 25, preferably two in number, thereby giving the picker a nozzle in each of his hands. The tube 22 supplies the picker on the rear seat 8 while the tube 23 supplies the nozzle for the forward picker on the seat 9.

I have shown the suction fan 20 of more or less special construction in order to prevent the cotton coming in contact with the blades of the fan. I have provided means for preventing the same entering the fan blades by by-passing the same about the fan into the discharged pipe leading from the fan. Referring to the suction fan a manifold or outer elongated casing 26 surrounds the casing 27 of the fan 28 transversely in spaced relation thereto. The fan 28 is journalled to the shaft 29 in the usual manner. The shaft 29 is driven from the power take off 30 of the tractor 5 through the belt 31. The manifold 26 has an endless screen composed of spaced upper and lower connected chains 32 trained about the drive sprockets 33 and idler sprockets 34. The intake manifold or pipe 35 enters the manifold 26 at an inlet opening or intake throat 35' of a coupled short pipe 36. The air passes into the housing 27 of the fan 28 through an inlet opening or throat 37 in one side wall of housing or casing 27 at a short inlet pipe 37', adjacent an edge of the fan 28 in line with inlet opening 35'. The cotton is prevented from entering through this opening with the air in the following manner. The endless screen and chain drive sprockets 33 are driven from the shaft 29 for actuating the fan. The shaft 29 is connected to and operates a shaft 50, through a worm gear drive 51, which is terminally provided with driving gear mechanism 52 for operating the shaft of the chain drive sprockets 33.

An endless screen composed of bars 38 connecting the chains 32 runs across between the intake 35' and the intake 37, best illustrated in Figures 4 and 5, the cotton being held from passing through due to the endless screen formed by the cross bars 38 extending between and connecting the chains 32. The endless screen travels in the direction of the arrow in Figure 4 and the cross bars 38 and barbs 39 formed on the bars engage the cotton at the point 40 forcing it through the space 41 and out into the discharge manifold, extension pipe or spout 42 at exit opening 43 of outer casing 26, which is in line with exit opening 43' in the periphery of fan casing 27, where the air is being discharged from the fan 28. This air passes through the endless screen and removes the cotton therefrom from where it is blown through and from extended discharge pipe or spout 42 into the rack 44 hitched to the tractor 5 as indicated in Figure 1. The speed of the chains 32 and endless screen is relatively slow, therefore no injury can come to the cotton seed which is the object of providing this type of a device for preventing the cotton seed being blown into the high speed fan 28. This is one of the outstanding features of my vacuum system. I do not wish to be limited to this method of preventing the same from reaching the fan 28, but it is a preferred form. Air seals 45 and 46 are provided for preventing air entering the fan other than through the manifold 36. A special flap or valve 47 prevents air entering, but will allow the cotton to be pulled by the same by the barbs 39 of the bars 38 connecting chains 32 of the endless screen.

I will now describe the operation of my new and improved cotton picker. As the machine travels between the rows of cotton 13, the picker seated on the seat 9 for instance, referring to Figure 3, picks the cotton from the row 48, while the picker seated on the seat 8 picks the cotton from the row 49 and there can be any number of pairs of pickers, depending on the width of the machine, as the machine travels slowly through the rows of cotton plants the pickers use both nozzles in their hands to contact the cotton and the instant the nozzles touch the cotton it will be removed and drawn into the manifolds 21 and through the suction fan assembly 20 as above described.

I do not wish to be limited to the exact mechanical structure as illustrated, as other mechanical equivalents may be substituted still carrying out the objects of my invention.

I claim:

1. A cotton picker comprising a fan casing, a fan mounted in the casing, the fan casing having an inlet opening formed in one side wall adjacent the edge of the fan, the fan casing having an exit opening formed in its periphery, an elongated casing extending transversely around the fan casing and spaced therefrom, the elongated casing having an inlet opening in line with the inlet opening in the side of the fan casing, the elongated casing having an exit opening in line with the exit opening in the fan casing, an endless screen mounted in the space formed between the fan casing and the elongated casing, said screen being spaced from the outer walls of the elongated casing to form a cotton receiving channel, the screen passing across the aligned inlet openings in the fan casing and the elongated casing and the exit openings in the fan and elongated casing, means including a picking nozzle for supplying cotton to the inlet opening in the elongated casing and against the screen to be conveyed through the channel to the exhaust opening in the elongated casing, and means for operating the screen.

2. In a cotton picker comprising a fan casing formed with inlet and outlet openings, a fan in the casing, an endless screen mounted to pass across the inlet and outlet openings in the fan casing, an elongated casing spaced from the endless screen between the inlet and outlet openings in the fan casing to form a channel, a spout communicating with the exit end of the channel, a pipe in alignment with the inlet opening in the fan casing to supply cotton to the screen to be conveyed through the channel to the spout, and means for operating the endless screen.

3. In a cotton picker comprising a fan casing, a fan in the casing, the casing having inlet and outlet openings, an elongated casing extending transversely around the fan casing and spaced therefrom, the elongated casing having an inlet opening in alignment with the inlet opening in the fan casing, and an exit opening in the elongated casing in alignment with the exit opening in the fan casing, an endless screen mounted in the space formed between the fan casing and the elongated casing, guide wheels in the elongated casing to support the endless screen, the screen passing across the aligned inlet and exit openings, whereby cotton supplied through the inlet opening in the elongated casing to the screen will be conveyed to the exit opening in said elongated casing for discharge, means for moving the endless screen, means providing an opening in the elongated casing adjacent the inlet opening for receiving cotton supplied to the screen, and means for supplying cotton to the latter means.

VERNE E. EDMONDS.

REFERENCES CITED

The following references are of record in the file of this patent:

UNITED STATES PATENTS

| Number | Name | Date |
|---|---|---|
| 545,117 | Young | Aug. 25, 1895 |
| 574,990 | Griffin | Jan. 12, 1897 |
| 764,447 | Franek | July 5, 1904 |
| 911,802 | Baldwin | Feb. 9, 1909 |
| 1,037,659 | Rembert | Sept. 3, 1912 |
| 1,051,796 | Zimmerman | Jan. 28, 1913 |
| 1,346,282 | Tibbs | July 13, 1920 |
| 1,370,347 | Nelson | Mar. 1, 1921 |
| 1,504,846 | Tarkington | Aug. 12, 1924 |
| 1,971,349 | Koon | Aug. 28, 1934 |
| 2,222,637 | Stukenborg | Nov. 26, 1940 |
| 2,378,143 | Jensen | June 12, 1945 |

FOREIGN PATENTS

| Number | Country | Date |
|---|---|---|
| 308,618 | Italy | June 9, 1933 |